United States Patent [19]
Accettura

[11] Patent Number: 5,083,828
[45] Date of Patent: Jan. 28, 1992

[54] CAMPER SHELL UTILITY SHELF

[76] Inventor: Joseph C. Accettura, 2920 California Ave., Carmichael, Calif. 95608

[21] Appl. No.: 712,355

[22] Filed: Jun. 7, 1991

[51] Int. Cl.$^5$ .................................................. B60R 7/00
[52] U.S. Cl. .................................. 296/37.6; 296/37.8
[58] Field of Search .................. 296/37.6, 37.8, 37.16, 296/24.1, 163, 164, 165

[56] References Cited

U.S. PATENT DOCUMENTS

| | | |
|---|---|---|
| 1,852,357 | 4/1932 | Merhar . |
| 2,767,896 | 10/1956 | Beck .................. 296/37.16 X |
| 2,768,043 | 10/1956 | Kristoff et al. . |
| 2,984,515 | 5/1961 | Hocks et al. ................ 296/164 |
| 3,249,382 | 5/1966 | Swithenbank . |
| 3,469,090 | 9/1969 | Redas ...................... 296/24.1 |
| 3,806,183 | 4/1974 | Sieren et al. ............... 296/24.1 |
| 3,891,263 | 6/1975 | Orsulak .................... 296/24.1 |
| 4,270,790 | 6/1981 | Curotto .................... 296/37.16 |
| 4,381,715 | 5/1983 | Forman . |
| 4,635,992 | 1/1987 | Hamilton et al. . |
| 4,674,665 | 6/1987 | Van Kirk . |
| 4,892,346 | 1/1990 | Berlin . |
| 4,900,080 | 2/1990 | Morris, II . |
| 4,938,519 | 7/1990 | Schlachter . |
| 4,944,544 | 7/1990 | Dick . |
| 4,993,771 | 2/1991 | Ingerson et al. ............. 296/37.6 |
| 4,998,425 | 3/1991 | Hoogland ................ 296/37.6 X |

*Primary Examiner*—Margaret A. Focarino
*Assistant Examiner*—Joseph D. Pape
*Attorney, Agent, or Firm*—John P. O'Banion

[57] ABSTRACT

A utility shelf apparatus for a pick-up truck (10) of the type having a cab (12), a sliding rear cab window (16), a cargo bed (14), and a camper shell (20). The apparatus has a right lower support member (22) and a left lower support member (28) which are joined to span the full width of the cargo bed (14) and which is mounted behind the cab of the pickup truck. A right back member (48) and left back member (50), which can be transparent are joined together and attached to the rear edges of the lower support members in a vertical orientation, and includes a cutout (56) in the central area so that the driver's vision is not impaired. Articles which are placed on the support member are accessible to the driver of the vehicle from inside the cab through the sliding rear cab window (16), and are restrained from falling into the cargo bed by the back member of the apparatus. The apparatus can have a fixed width or be adjustable in width to fit a variety of pick-up truck cargo bed widths.

12 Claims, 3 Drawing Sheets

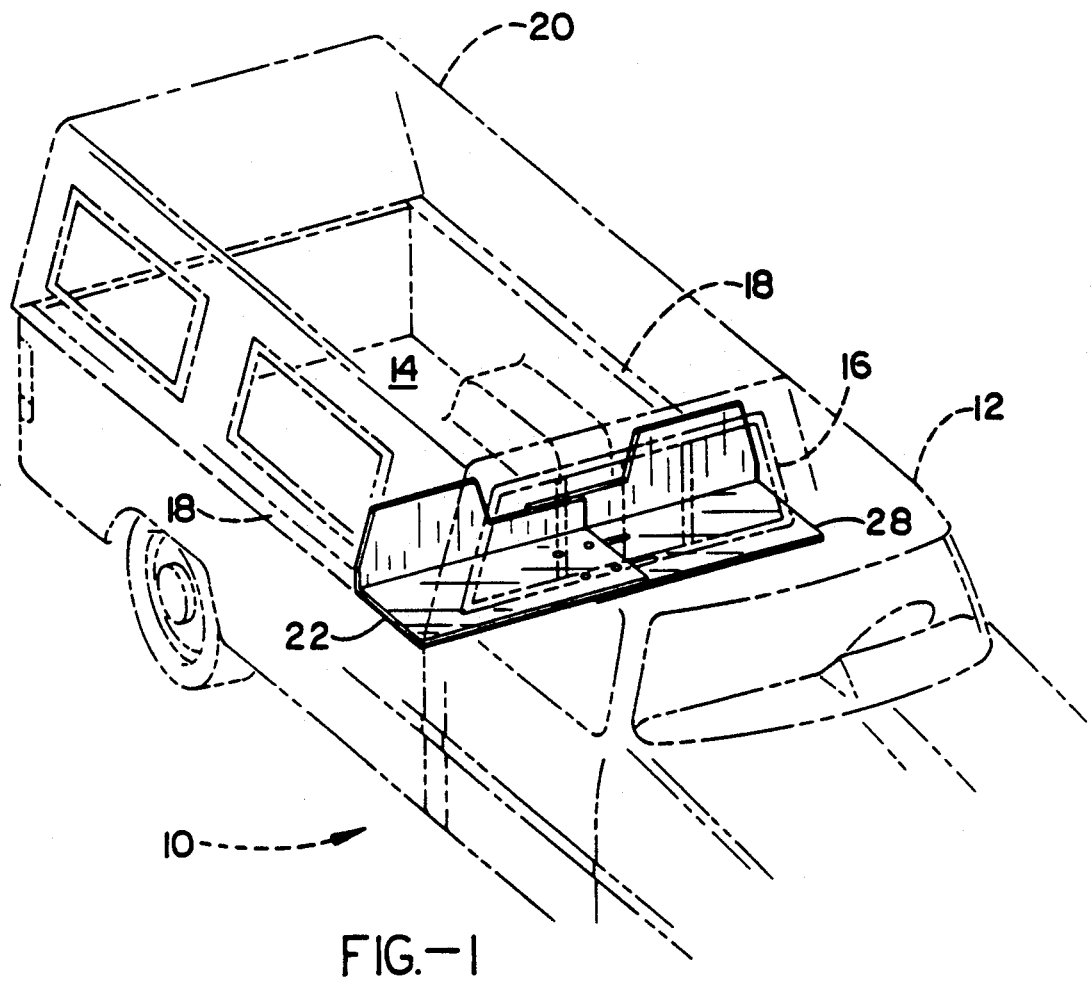
FIG.—1
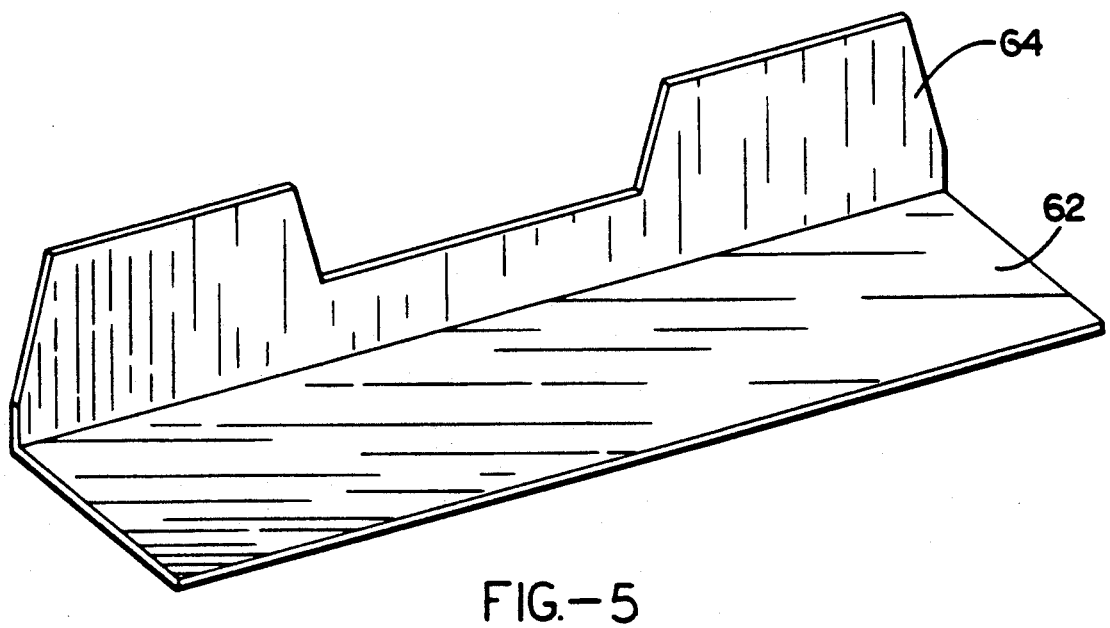
FIG.—5

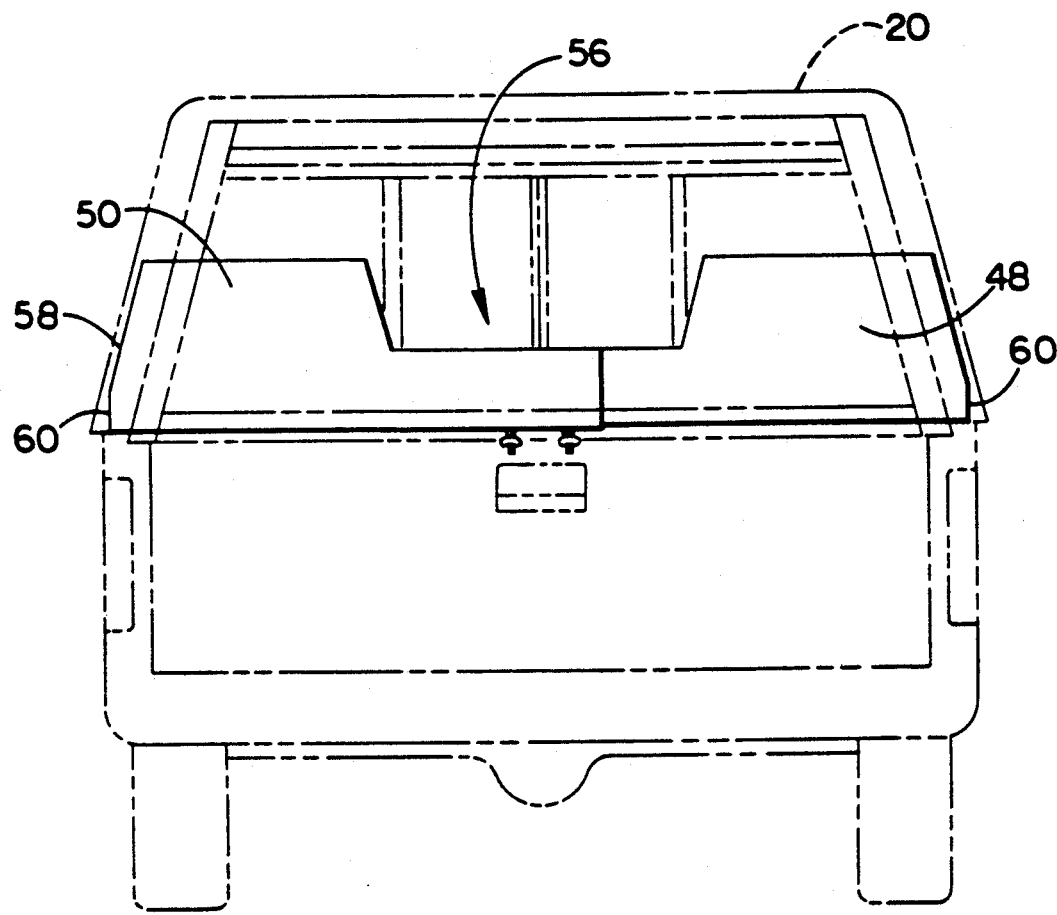
FIG.—4

CAMPER SHELL UTILITY SHELF

BACKGROUND OF THE INVENTION

1. Field of the Invention

This invention pertains generally to transporting cargo and the like in vehicles, and more particularly to a utility shelf for use with pick-up trucks having camper shells.

2. Description of the Background Art

It is common for owners of pick-up trucks with open beds to cover those beds to protect cargo or the like which is being transported. Frequently a camper shell is used to provide protection from the elements as well as to guard against theft of articles being transported In many instances, when the driver of the vehicle requires access to an article in the cargo bed, the vehicle must be stopped and access gained through the rear door of the camper shell.

Now that sliding windows are being installed in the rear of pick-up truck cabs, the driver has access to the cargo area without having to leave the vehicle. However, access is limited to the driver's arm reach which generally is not long enough to reach items on the floor of the cargo bed This limitation makes it inconvenient to gain access to lunch boxes, maps, hand tools, and other small items which the driver might require. Therefore, there is a need for a convenient shelf apparatus which can be positioned within reach of the driver and which can hold small items for easy access, some items being accessible without having to stop the vehicle.

Various approaches to shelves and cargo boxes have been previously developed. For example, U.S. Pat. No. 4,381,715 issued to Forman on May 3, 1983, discloses an adjustable shelf mounting system capable of bearing heavy loads. U.S. Pat. No. 1,852,357 issued to Merhar on April 5, 1932, discloses a combination serving tray and table for automobiles. U.S. Pat. No. 2,768,043 issued to Kristoff et al. on Oct. 23, 1956, discloses an adjustable service tray for use in motor vehicles. U.S. Pat. No 4,900,080 issued to Morris II on Feb. 13, 1990, discloses a partial cover for a pick-up truck bed. U.S. Pat. No. 4,635,992 issued to Hamilton et al. on Jan. 13, 1987, discloses a moveable vehicular storage box. U.S. Pat. No. 4,938,519 issued to Schlacter on July 3, 1990, discloses a security enclosure for open deck vehicles. U.S. Pat. No. 4,944,544 issued to Dick on July 31, 1990, discloses a vehicle accessory storage device. U.S. Pat. No. 4,674,665 issued to Van Kirk on June 23, 1987, discloses a vehicle tool box with peripheral drain means. None of these patents, however, disclose a utility shelf for campers which is accessible from the cab of a pick-up truck.

Examples of devices which provide for storage of cargo and which are accessible through the rear window of a pick-up truck can be seen in U.S. Pat. No. 4,892,346 issued to Berlin on Jan. 9, 1990, which discloses a drop in utility enclosure apparatus having a cargo chamber and shelves, as well as a sliding window which is accessible through the rear window of a truck to which the apparatus is mounted; and U.S. Pat. No. 3,249,382 issued to Swithenbank on May 3, 1966, which discloses a detachable cargo box which is accessible through the rear window of the truck cab against which the apparatus is mounted, and which has a an expansive rear window through which the driver can see for safety. Both of those devices, however, are effectively scaled-down versions of camper shells and neither of them are adaptable to a pick-up truck already having a camper shell. Nor are either of those devices easily adjustable to fit any width of pick-up truck.

The foregoing patents reflect the state of the art of which the applicant is aware and are tendered with the view toward discharging applicant's acknowledged duty of candor in disclosing information which may be pertinent in the examination of this application. It is respectfully stipulated, however, that none of these patents teach or render obvious, singly or when considered in combination, applicant's claimed invention.

SUMMARY OF THE INVENTION

The present invention is a utility shelf for use with pick-up trucks to which camper shells are attached, and which have sliding windows or the like in the rear of the truck cab through which access to the area enclosed by the camper shell can be gained. The apparatus generally comprises a lower support member and an upper back member, the back member being mounted perpendicular to the support member in a position which is away from the vehicle cab. In the preferred embodiment, the apparatus has two separable shelf halves, each of which has a support member and a back member. The support member of one shelf half contains slotted guides whereas the other support member contains holes which can be aligned with the slotted guides in the first support member. Carriage bolts are inserted through the holes and slotted guides, thereby making the apparatus adjustable in width. When the shelf halves are assembled, there exists a cutout portion centrally located in the back of the apparatus to provide a zone of clear vision to the rear of the vehicle. Also, the sides of the apparatus can be angled to fit the shape of the side walls of a typical camper shell. An alternative embodiment of the invention is fixed in width and utilizes one-piece support and back members.

An object of the invention is to provide a shelf-like storage area enclosed by a camper shell which is accessible by the driver of a pick-up truck without leaving the vehicle.

Another object of the invention is to provide the driver of a pick-up truck with a camper shell with access to a shelf-like storage area through the rear cab window.

Another object of the invention is to permit the driver of a pick-up truck to easily reach small articles stored in the area enclosed by a camper shell while the vehicle is moving.

Another object of the invention is to provide a utility shelf for a pick-up truck which is adjustable in width.

Another object of the invention is to provide a utility shelf which is universally mountable on various sizes of pick-up trucks.

Another object of the invention is to provide a utility shelf positioned behind the driver of a pick-up truck which does not obstruct the driver's view.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 1 is a perspective view of the present invention installed on a pick-up truck shown in phantom.

FIG. 4 is a rear elevation view of the present invention installed on a pick-up truck shown in phantom.

FIG. 5 shows an alternative embodiment of the present invention which is fixed in width.

DESCRIPTION OF THE PREFERRED EMBODIMENTS

Figure 2:
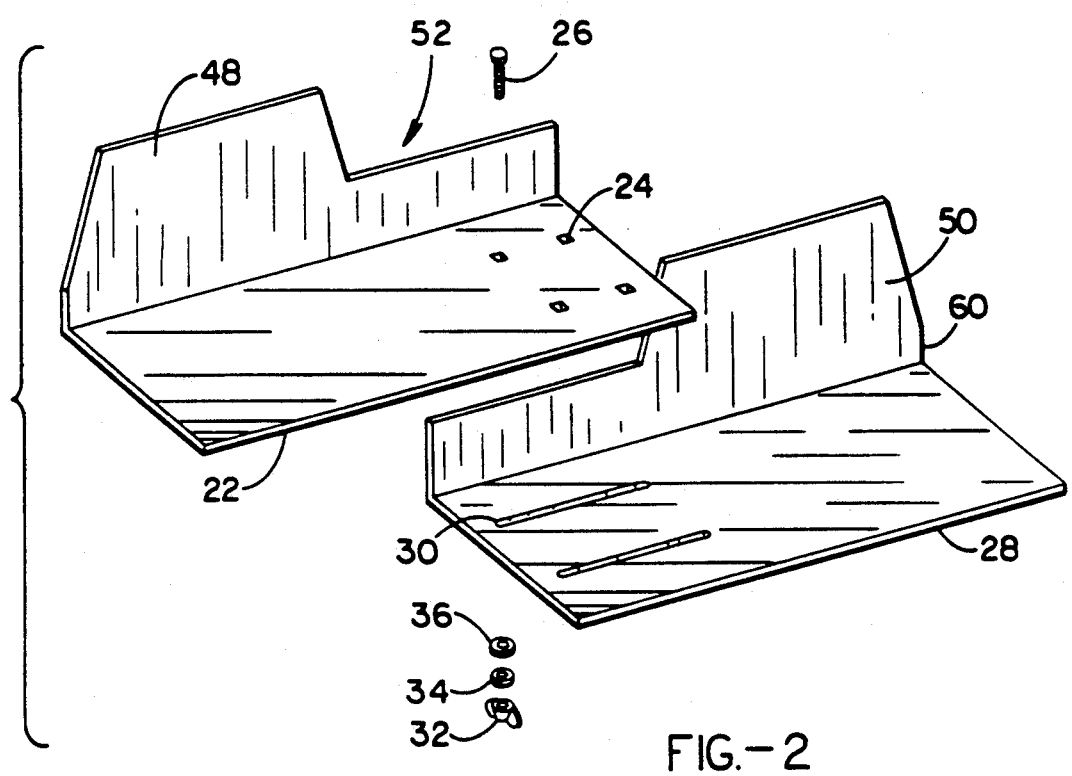
FIG. 2 is an exploded view of the present invention.

Referring more specifically to the drawings, for illustrative purposes the present invention is embodied in the apparatus generally shown in FIG. 1 through 4. It will be appreciated that the apparatus may vary as to configuration and as to details of the parts without departing from the basic concepts as disclosed herein.

Referring to FIG. 1, the apparatus is installed on a pick-up truck 10 having a cab 12, cargo bed 14, rear cab window 16, side walls 18, and camper shell 20. The apparatus is positioned in the area of cargo bed 14 immediately behind cab 12. Access to the apparatus is gained from cab 12 by reaching through window 16. Window 16 will either be an opening in the back of cab 12 or, more typically, a sliding rear window.

Figure 3:
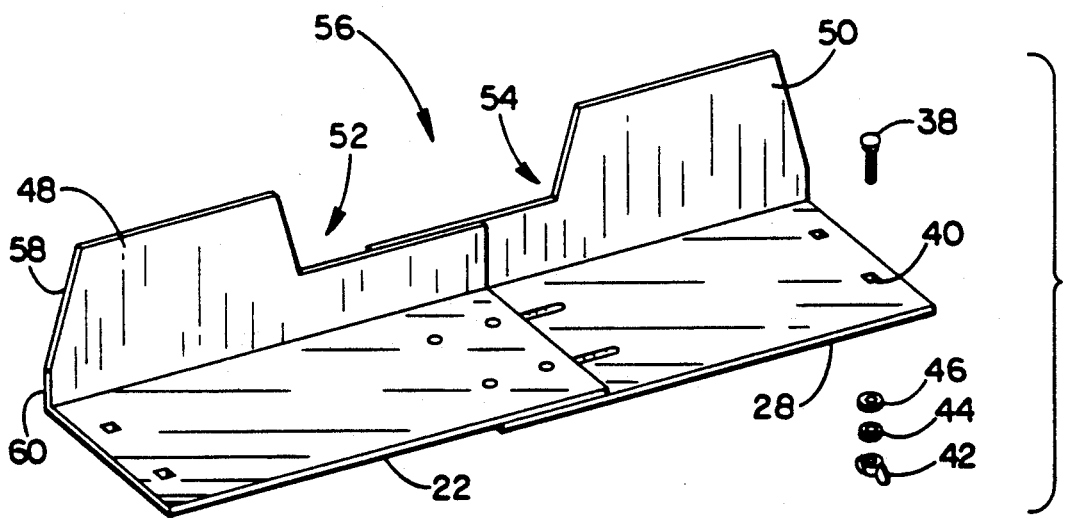
FIG. 3 is an assembled view of the present invention.

Referring to FIG. 2 and FIG. 3, first support member 22 is flat and generally rectangular in shape. Located near one end of first support member 22 is a plurality of holes 24 through which bolts 26 can be inserted. Second support member 28 is also flat and generally rectangular in shape. Located near one end of second support member 28 is a plurality of elongated slots 30 which ar aligned longitudinally between the ends of second support member 28. When first support member 22 is stacked on top of second support member 28, bolts 26 extend through holes 24 and slots 30 to join the two support members. Wing nut 32, lock washer 34 and flat washer 36 engage bolt 26 to secure the two support members in place. Since slots 30 are elongated, first support member 22 slidably engages second support member 28 and the relative position between first support member 22 and second support member 28 is adjustable. This permits the apparatus to be adjusted in width to fit various sizes of cargo beds. Note also, that holes 24 are preferably square and bolts 26 are preferably carriage bolts to provide for convenient tightening of the two support members.

While first support member 22 and second support member 28 can rest on top of side walls 18 to transverse cargo bed 14, it is preferable to fasten them to side walls 18 to prevent sliding. This can be accomplished with double-sided tape, brackets mounted to the underside of the support members as well as to the side walls, or by using bolts 38 extending through holes 40 in the support member as well as through matching holes in side wall 18, and securing the assembly in place using wing nut 42, lock washer 44, and flat washer 46. Double-sided tape is preferred for removable installations, whereas the other approaches are suitable for a more permanent installation.

First back member 48 is joined to first support member 22 along corresponding edges as shown, with first back member 48 being oriented vertically. First back member 48 and first support member 22 can be joined in any manner which provides for a rigid bond, such as nails, screws, glue, or the like. Second back member 50 is similarly joined to second support member 28 in a vertical orientation. Installation of the apparatus is such that first back member 48 and second back member 50 are positioned toward the rear of cargo bed 14 to effectively create a compartment between cab 12 and the back members.

First back member 48 includes a notch 52 located near the end of first support member 22 which will be joined to second support member 28. Second back member 50 includes a similar notch 54. These notches extend from the upper lengthwise edges of said back members toward the lower lengthwise edges to form a synclinal shaped cutout, or opening 56, through which the driver's vision is unimpaired. To further increase safety, first back member 48 and second back member 50 are preferably made of a transparent material such as plexiglass. The notches extend only so far as to provide a clear, unimpaired view, while still maintaining a lip above the support members against which articles being transported can rest.

Referring to FIG. 3 and FIG. 4, first back member 48 has an angled end 58 as does second back member 50, the angle matching the angle which is commonly found in the side wall of camper shell 20. Also note the use of vertical stem wall 60. This permits angled end 58 to abut the inner wall of camper shell 20 while still permitting the apparatus to be removed by rotation and sliding.

An alternative embodiment of the apparatus is shown in FIG. 5, where the width of the apparatus is fixed. Support member 62 is a one piece flat rectangular member to which back member 64 is attached in a vertical orientation, back member 64 also being of one piece construction.

The apparatus, in either of the embodiments disclosed as well as their equivalents, can be fabricated from wood, plastic, and similar lightweight, rigid materials. However, where clear vision is important, a transparent material such as plexiglass is preferred.

Accordingly, it will be seen that this invention provides for convenient access to articles being transported in the cargo bed area of a pick-up truck enclosed by a camper shell. Although the description above contains many specificities, these should not be construed as limiting the scope of the invention but as merely providing illustrations of some of the presently preferred embodiments of this invention. Thus the scope of this invention should be determined by the appended claims and their legal equivalents.

I claim:

1. An article carrier for mounting in the cargo bed area of a pick-up truck of the type having a cab, a rear cab window, cargo bed, cargo bed side walls, and a camper shell, comprising:
   (a) a generally flat rectangular support member;
   (b) means for attaching the ends of said support member to the side walls of a pick-up truck, said support member extending transversely between the upper edges of said side walls in proximity to the rear cab window of said pick-up truck, said support member having a rearward lengthwise edge projecting toward the rear of said pick-up truck; and
   (c) a generally flat back member, said back member extending transversely between the upper edges of said side walls in an orientation substantially perpendicular to said support member, said back member having an upper lengthwise edge and a lower lengthwise edge, said lower lengthwise edge of said back member joined to said rearward projecting lengthwise edge of said support member, the ends of said back member being angled to abut the inner walls of a camper shell.

2. The apparatus as recited in claim 1, further comprising a cutout, said cutout positioned near the central portion of said back member and extending from said upper lengthwise edge of said back member toward said lower lengthwise edge of said back member.

3. The apparatus as recited in claim 2, wherein said cutout is synclinal shaped.

4. The apparatus as recited in claim 1, wherein the length of said support member and said back member is adjustable.

5. The apparatus as recited in claim 4, wherein said support member comprises:
  (a) a first support section, said first support section including a plurality of holes located near one end;
  (b) a second support section, said second support section including a plurality of elongated slots located near one end, said slots mating with said holes; and
  (c) means for fastening said first support section and said second support section, said fastening means extending through said holes and said slots, said first support section slidably engaging said second support section.

6. The apparatus as recited in claim 5, wherein said fastening means comprises a plurality of carriage bolts.

7. The apparatus as recited in claim 1, wherein said back member is transparent.

8. A utility shelf for camper vehicles, comprising:
  (a) a first support member, said first support member having a first end and a second end, said first support member including a plurality of holes located near said first end;
  (b) a second support member, said second support member having a first end and a second end, said second support member including a plurality of elongated slots located near said first end;
  (c) engagement means for joining said first ends of said support members, said means extending through said holes and said slots, said first support member slidably engaging said second support member;
  (d) means for fastening said second ends of said joined support members to opposing side walls of a pick-up truck cargo bed, said joined support members extending transversely between the upper edges of said side walls in proximity to the rear cab window of said pick-up truck, said joined support members having rearward lengthwise edges projecting toward the rear of said pick-up truck;
  (e) a first back member, said first back member having an upper lengthwise edge and a lower lengthwise edge, said lower lengthwise edge of said first back member joined to said rearward lengthwise edge of said first support member in a substantially vertical orientation;
  (f) a second back member, said second back member having an upper lengthwise edge and a lower lengthwise edge, said lower lengthwise edge of said second back member joined to said rearward lengthwise edge of said second support member in a substantially vertical orientation; and
  (g) a plurality of notches, said notches positioned near the adjacent edges of said back members, said notches extending from said upper lengthwise edges of said back members toward said lower lengthwise edges of said back members, whereby an unobstructed opening through said back members is formed.

9. The apparatus as recited in claim 8, wherein at least one edge of each of said back members is angled.

10. The apparatus as recited in claim 9, wherein said engagement means comprises a plurality of carriage bolts.

11. The apparatus as recited in claim 10, wherein said back members are transparent.

12. An article carrier for attachment to a pick-up truck with a camper shell, comprising:
  (a) a generally flat planar support member,
  (b) means for attaching the ends of said support member to the side walls of a pick-up truck, said support member extending transversely between the upper edges of said side walls in proximity to the rear cab window of said pick-up truck, said support member having a rearward lengthwise edge projecting toward the rear of said pick-up truck;
  (c) a transparent generally flat planar back member, said back member extending transversely between the upper edges of said sidewalls in an orientation substantially perpendicular to said support member, said back member having an upper lengthwise edge and a lower lengthwise edge, the ends of said back member being sloped from the lower lengthwise edge toward the upper lengthwise edge, said lower lengthwise edge of said back member joined to said rearward lengthwise edge of said support member; and
  (d) a cutout, said cutout positioned near the central portion of said back member and extending from said upper lengthwise edge of said back member toward said lower lengthwise edge of said back member.

* * * * *